United States Patent [19]

Boateng

[11] Patent Number: 5,084,180
[45] Date of Patent: Jan. 28, 1992

[54] METHOD FOR TREATING ZINC-CONTAINING SULFATE SOLUTION

[75] Inventor: Daniel A. D. Boateng, Montrose, Canada

[73] Assignee: Cominco Ltd., Vancouver, Canada

[21] Appl. No.: 603,082

[22] Filed: Oct. 25, 1990

[51] Int. Cl.⁵ .............................................. B01D 61/44
[52] U.S. Cl. .................................... 210/638; 210/644; 423/100
[58] Field of Search ......... 210/634, 638, 644, 649–654; 204/64 R, 68, 69, 180.1, 182.1, 182.3, 182.4, 186, 299 R; 423/24, 100

[56] References Cited
U.S. PATENT DOCUMENTS
3,989,607 11/1976 Bush et al. ...................... 423/100

Primary Examiner—Frank Sever
Attorney, Agent, or Firm—Arne I. Fors

[57] ABSTRACT

There is provided a method for treating zinc-containing sulfate solutions which comprises an acid removal for the recovery of a substantially pure sulfuric acid solution and a solution low in acid and containing the zinc and metal impurities from the sulfate solution. The acid removal is carried out by a membrane process that consists of dialysis, electrodialysis or dialysis integrated with electrodialysis. The dialyzate or diluate is subjected to a dual-circuit, side-by-side, simultaneous solvent extraction of zinc and sulfuric acid. In one circuit sulfuric acid is extracted from the dialyzate or diluate and the raffinate from the zinc extraction with an amine-containing extractant. Acid is stripped from the loaded organic with water or an alkaline substance, and is recovered as sulfuric acid or as a sulfate, preferably as ammonium sulfate. In the other circuit, zinc is extracted from the raffinate from the acid extraction with an organic phosphoric-, phosphinic-, phosphonic- or thiophosphinic acid-containing extractant. The zinc is stripped from the loaded organic with acid, and is recovered as a concentrated zinc sulfate solution. A residual solution substantially containing the impurities is removed from the process. The extraction and stripping may be carried out in one or more stages.

29 Claims, 2 Drawing Sheets

METHOD FOR TREATING ZINC-CONTAINING SULFATE SOLUTION

This invention relates to a method for treating zinc-containing sulfate solutions for the recovery of zinc and sulfuric acid.

BACKGROUND OF THE INVENTION

In the process for the recovery of zinc from minerals, mineral concentrates may be treated in a variety of ways that include the roast-leach-electrowinning and the pressure leach-electrowinning processes. During processing, many zinc-containing sulfate solutions are encountered from which it is often desirable to recover both the zinc and the sulfuric acid. Such solutions may contain from relatively low to relatively high amounts of zinc, sulfuric acid or both. For example, in the electrowinning of zinc from zinc sulfate electrolyte, purified electrolyte is subjected to electrolysis, zinc is deposited on the cathodes and recovered, and a portion of the circulating electrolyte is purged as spent acid to control the accumulation of impurities. Other solutions encountered in hydrometallurgical zinc processes, for example, are ones that contain zinc, sulfuric acid and other metal values and impurities. Such solutions are often treated first for the recovery of metal values and the residual solutions must then be treated before discarding to prevent ecological damage. Similarly, solutions containing small amounts of zinc and concentrations of certain impurities must be treated prior to discharge to the environment.

BRIEF DESCRIPTION OF THE PRIOR ART

Numerous processes exist for the recovery of metal values and for the removal of acid and impurities from solutions. Aside from conventional precipitation, crystallization and evaporation processes, such processes include ion exchange, solvent extraction and membrane processes such as membrane electrolysis, reverse osmosis, dialysis and electrodialysis.

Many methods have also been developed specifically for treating the purge of spent electrolyte for the recovery of values and for minimizing effects on the ecology when solutions are discarded. The methods include electrolysis for stripping a portion of the contained zinc, concentration for the precipitation and recovery of zinc sulfate, membrane electrolysis or electrodialysis for the recovery of acid which may include the cathodic deposition of zinc, ion exchange, dialysis, solvent extraction of zinc, usually with organic phosphoric phosphonic or phosphinic acid-type extractants, and solvent extraction of acid with amine-type extractants.

In general, these methods for treating zinc-containing sulfate solutions do not provide the desired separation of zinc sulfate from sulfuric acid and, in many cases, leave a residual solution that must be further treated before being discarded.

SUMMARY OF THE INVENTION

I have now discovered that zinc-containing sulfate solutions may be successfully treated to remove the major portion of the sulfate content as a solution of sulfuric acid and to recover a substantially pure acid zinc sulfate solution. The sulfuric acid solution and the zinc sulfate solution may be returned to the zinc recovery process. An effluent solution is formed that is substantially free of zinc, is low in acid and contains impurity elements such as magnesium and manganese.

More specifically, zinc-containing sulfate solutions containing sulfuric acid are subjected to an acid removal step for the formation of an acid solution and a solution low in acid and containing substantially all the zinc and the impurity metals. The acid removal is carried out by a membrane process such as dialysis or electrodialysis alone or in combination. The acid-reduced solution which contains substantially all the zinc from the zinc-containing sulfate solution, is then subjected to solvent extraction for the extraction of zinc and acid, and for the formation of a residual solution substantially free of zinc but containing the impurity metals such as magnesium and manganese, and having a low acid content. The residual solution is removed from the process.

When using dialysis, zinc-containing sulfate solution as feed solution is fed into the dialyzate compartments of a dialysis unit containing alternating dialyzate and diffusate compartments separated from each other by anionic membranes. The diffusate, withdrawn as product, is a solution of sulfuric acid substantially free of zinc. The dialyzate which contains substantially all the zinc and impurity metals that are present in the feed solution, is passed to solvent extraction.

When using electrodialysis, zinc-containing sulfate solution as feed solution is fed to the diluate compartments of an electrodialysis unit comprising alternating anionic and cationic membranes between a cathode and an anode. Concentrate is circulated through the concentrate compartments, and a portion of the circulating concentrate is removed as a sulfuric acid solution concentrated in acid as compared to the feed solution. Diluate from the diluate compartments is circulated to the diluate compartments, and a portion of the circulating diluate is removed and passed to solvent extraction. The removed diluate has a reduced acid content and contains substantially all the zinc from the feed solution. Electrodialysis may be carried out in one or more stages, as necessary to achieve the desired degree of sulfuric acid removal.

According to another embodiment, zinc-containing sulfate solution is subjected to dialysis for the formation of a dialyzate relatively low in acid and containing substantially all the zinc and impurity metals from the feed solution. The dialyzate is passed to the subsequent solvent extraction. The diffusate is passed to the diluate compartments of an electrodialysis unit and a portion of the circulating diluate is returned to the diffusate compartments of the dialysis unit. Preferably, the concentration of acid in the returning diluate is maintained low by the addition of water or other solution in order to increase the driving force for the dialysis. In the electrodialysis, a concentrate is formed which is recycled to the concentrate compartments. A portion of the circulating concentrate is removed as concentrated acid product substantially free of metal cations.

The dialyzate from dialysis or the diluate from electrodialysis is subjected to a dual-circuit, side-by-side, simultaneous solvent extraction of zinc sulfate and sulfuric acid. The pH in the zinc extraction is controlled in the range of about 1.3 to 5. In the one circuit, acid is extracted with a suitable extractant from feed solution and from the raffinate from the other circuit for the extraction of zinc. Separated organic phase from the acid extraction is subjected to stripping with water or an alkaline substance for the recovery of sulfuric acid or a sulfate. The raffinate from the acid extraction is passed to the zinc extraction step where zinc is extracted with a suitable extractant. The raffinate from the zinc extraction, which also contains sulfuric acid generated in the zinc extraction, is passed to the acid extraction step. Separated organic phase is subjected to stripping with an acid solution, and a zinc sulfate solution suitable for return to the hydrometallurgical process for the recovery of zinc is recovered.

The solvent extraction may be carried out in one or more side-by-side, simultaneous extraction stages in a countercurrent, cross-current or co-current fashion. Suitable extractants for sulfuric acid include primary, secondary, tertiary and quaternary amines, and suitable extractants for zinc sulfate include organic phosphoric, phosphinic, phosphonic and thiophosphinic acids.

According to the main embodiment of the invention there is provided a method for treating zinc-containing sulfate solution containing zinc sulfate, sulfuric acid and impurity metals which method comprises the steps of feeding zinc-containing sulfate solution to an acid removal for the formation of a first solution containing sulfuric acid, said first solution being substantially free of zinc and impurity metals, and for the formation of a second solution having a relatively low concentration of sulfuric acid and substantially containing the zinc and impurity metals; recovering said first solution; passing said second solution to dual-circuit, side-by-side simultaneous solvent extraction for the extraction of sulfuric acid in an acid extraction circuit with an organic extractant suitable for the extraction of sulfuric acid forming an acid extract and for the extraction of zinc in a zinc extraction circuit with an organic extractant suitable for the extraction of zinc forming a zinc extract, and the formation of residual solution; recovering sulfate from said acid extract as a compound chosen from the group consisting of sulfuric acid, sodium sulfate and ammonium sulfate; and recovering zinc from said zinc extract as a zinc sulfate solution.

It is an aspect of the present invention to provide a method for treating zinc-containing sulfate solutions.

It is another aspect to provide a method for removing sulfuric acid from zinc-containing sulfate solutions by dialysis, electrodialysis or both.

It is a further aspect to provide a method for simultaneously removing zinc sulfate and sulfuric acid from zinc-containing sulfate solutions by solvent extraction.

It is yet another aspect to provide a method for the removal of acid from zinc-containing sulfate solutions by a membrane process and a simultaneous, dual-circuit, side-by-side solvent extraction of zinc and sulfuric acid from the acid-reduced solution.

BRIEF DESCRIPTION OF THE ACCOMPANYING DRAWINGS

The aspects of the present invention will become apparent from the following detailed description with reference to the accompanying drawings wherein.

DETAILED DESCRIPTION OF THE PREFERRED EMBODIMENTS

According to the method of the present invention, zinc-containing sulfate solutions are treated for the recovery of values, which include zinc sulfate and sulfuric acid. The zinc-containing sulfate solutions may also contain impurities such as, for example, magnesium, manganese, sodium, potassium, chloride and fluoride as well as relatively small amounts of other dissolved metals such as, for example, Cd, Cu, As, Sb, Fe, Pb, Tl and Ge. The small amounts of other metals do not interfere with the recovery of a relatively pure acid and a relatively pure zinc sulfate solution. The impurities and other metals are generally removed in a residual solution, as will be described. If larger amounts of other metals are present, a major portion of such metals should be removed prior to processing the solution according to the instant invention. Impurities and other dissolved metals will be referred to as impurities hereinafter. The concentrations of zinc, acid and impurities in the zinc-containing sulfate solution depend on the composition of the zinc concentrates and on the process for the recovery of zinc. Spent electrolyte may contain, for example, from 10 to 100 g/L Zn, from 50 to 200 g/L sulfuric acid and from a few to about 20 g/L impurities. A typical spent electrolyte may contain, for example, 50 g/L Zn, 150 g/L $H_2SO_4$, 7 g/L Mg and 2 g/L Mn.

According to the main embodiment of the invention, zinc-containing sulfate solutions are fed to an acid removal for the formation and the recovery of a first solution containing sulfuric acid and being substantially free of zinc and the impurities, and for the formation of a second solution having a relatively low concentration of sulfuric acid and substantially containing the zinc and the impurities. The second solution is passed to a two-circuit, side-by-side simultaneous solvent extraction for the extraction of sulfuric acid in an acid extraction circuit with an organic extractant suitable for the extraction of sulfuric acid and for the extraction of zinc in a zinc extraction circuit with an organic extractant suitable for the extraction of zinc, and the formation of residual solution substantially containing the impurities. Sulfate is recovered from the acid extract as sulfuric acid or a sulfate, and zinc is recovered from the zinc extract as zinc sulfate solution.

Figure 1:
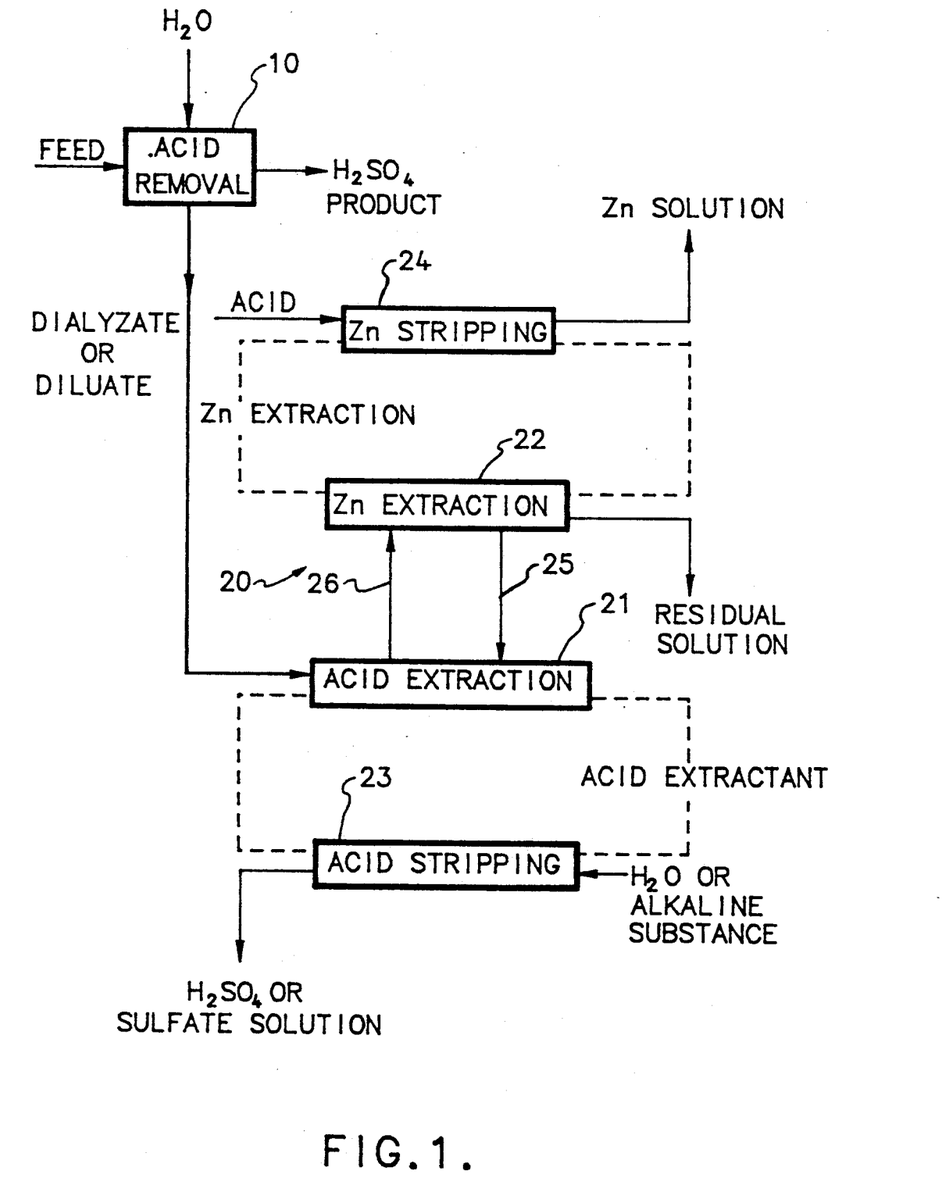
FIG. 1 is a schematic flowsheet of the main embodiment of the method according to the invention.

With reference now to FIG. 1, zinc-containing sulfate solution is fed as feed solution to an acid removal 10 for the formation of an acid solution substantially free of zinc and impurities, and of a solution having a reduced acid content and substantially containing the zinc and the impurities contained in the feed solution. Acid removal 10 is carried out by a membrane process. The membrane process may be dialysis, electrodialysis or dialysis integrated with electrodialysis. The feed solution is preferably filtered to remove substantially any contained solids prior to acid removal.

Dialysis is carried out in a dialysis unit divided into alternating dialyzate compartments and diffusate compartments separated by suitable anion permselective membranes. Suitable membranes are, for example, Selemion ™ DMV or DSV membranes. Other suitable membranes may be used. The suitable membranes are substantially impermeable to other dissolved species other than anions, in this case sulfate ions. Protons, however, easily transfer due to their small size and high mobility, thereby satisfying the requirement for electron neutrality.

Feed solution is fed into the dialyzate compartments at a rate of about 0.7 to 2.5 L/h.m². Water or an aqueous solution is fed into the diffusate compartments. Sulfate and bisulfate ions as well as hydrogen ions pass from the dialyzate compartments through the membranes into the diffusate compartments forming a dialyzate (second solution) in the dialyzate compartments and having a reduced acid content, and substantially containing the zinc and the impurities from the feed solution. A diffusate (first solution) containing sulfuric acid substantially free of zinc and impurities is formed in the diffusate compartments. The dialyzate is passed to a solvent extraction, generally indicated with 20, to be described. The diffusate is removed from the process as a product. The dialysis is carried out at ambient temperatures preferably at a temperature in the range of about 20° to 40° C., with the feed solution and water or other aqueous solution being fed countercurrently by gravity flow. The flows of feed solution and water are selected to give the desired acid recovery and concentration in the diffusate. Means for providing a desired temperature are provided. When dialysis is used by itself, the feed and water flows are normally selected to be about equal. The ions migrate through the membranes under the driving force created by the concentration gradient of sulfate ions across the membranes. The dialysis may be carried out in one or more stages.

Electrodialysis is carried out in an electrodialysis unit comprising a multiplicity of alternating suitable cation permselective exchange membranes and suitable anion permselective exchange membranes arranged in a stack between an anode and a cathode positioned at opposite ends of the unit in an anode compartment and a cathode compartment, respectively. Alternating diluate compartments and concentrate compartments are formed between the membranes. Suitable cationic membranes are, for example, Selemion TM CMV-A and CMR membranes, and suitable anionic membranes are, for example, Selemion TM AAV membranes. Other similarly suitable membranes may be used. The cathode is made of, for example, stainless steel and the anode is made of, for example, platinum-plated titanium. Other suitable electrode materials may be used.

The feed solution of zinc-containing sulfate solution is fed into the diluate compartments. During electrodialysis, acid anions in the feed solution to the diluate compartments pass from these compartments to the concentrate compartments through the anionic membranes. Acid-reduced solution is withdrawn as diluate from the diluate compartments. At least a portion of the withdrawn diluate may be recirculated to the diluate compartments. The remaining diluate is passed to solvent extraction 20, to be described. The acid-reduced diluate (second solution) substantially contains the zinc and the impurities from the feed solution. A minor loss of zinc occurs to the concentrate, i.e. solution concentrated in sulfuric acid (first solution). The loss of zinc to concentrate in electrodialysis is somewhat higher than the loss to the diffusate product obtained with dialysis. A concentrate is withdrawn from the concentrate compartments and at least a portion of the withdrawn concentrate may be circulated as feed to the concentrate compartments. The recirculation of diluate and concentrate is done mainly to ensure turbulent conditions in the compartments. If desired, an amount of water or other solution may be fed to the concentrate compartments to control the acid concentration. Concentrate containing sulfuric acid and substantially free of zinc and impurities is recovered.

The electrode compartments are rinsed with separate rinse solutions or a common rinse solution. Rinse solutions are chosen from dilute sulfuric acid and acidic sodium sulfate solution, are maintained at a pH in the range of about 0 to 4, and are circulated at flow rates in the range of about 25 to 90 L/h.m². Gases evolved at the electrodes are carried from the electrode compartments in rinse solution. The flows of concentrate, diluate and rinse solution through the respective compartments are adjusted such that the differential pressure across the membranes does not exceed about 150 kPa.

The electrodialysis is carried out at temperatures in the range of from 0° C. to about 60° C. and at direct currents applied between the electrodes equivalent to a value of the current density in the range of about 10 to 1000 A/m², preferably in the range of about 400 to 1000 A/m². Solution is fed to the electrodialysis at a rate in the range of about 2 to 40 L/h.m² per membrane pair. The flows through the compartments should be turbulent and substantially balanced across the membranes. Electrodialysis may be carried out in one or more stages. In order to obtain a high degree of acid removal or high acid concentrations in the product, two or more stages of electrodialysis may be required.

Figure 2:
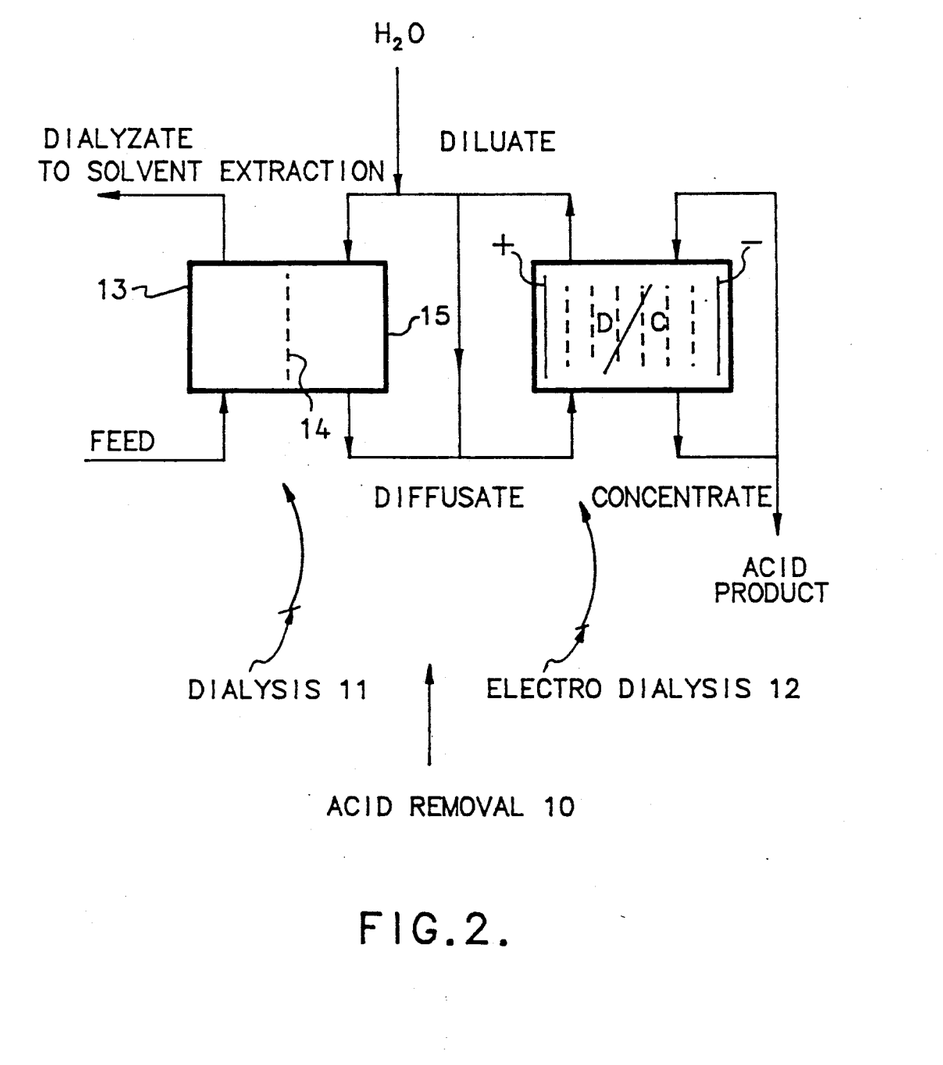
FIG. 2 is a schematic flowsheet of a preferred embodiment of the acid removal step of FIG. 1.

Either dialysis or electrodialysis is satisfactory in producing a sulfuric acid product and a solution reduced in acid content and substantially containing the zinc and the impurities from the feed solution to the acid removal 10. The removal of acid in acid removal 10, however, is improved when both dialysis and electrodialysis are used in an integrated fashion, as shown in FIG. 2. When dialysis alone is used, best results are achieved at feed and water rates of 0.7 to 1.4 L/h.m² at temperatures of from about 10° to 25° C., and up to 2.5 L/h.m² at 40° to 45° C. The concentration of acid in the diffusate is usually lower and may only be slightly higher than that of the feed solution. When electrodialysis is used by itself as acid removal step, zinc losses occur which detract from the desired efficiency, and multiple stages may be required to improve the separation. However, when both dialysis and electrodialysis are used in an integrated fashion, increased feed and water rates to the dialysis can be used, and a more highly-concentrated acid product containing a negligible amount of zinc can be produced, while forming a low acid metal-containing solution for feeding to solvent extraction 20.

With reference now to FIG. 2, which shows another embodiment of acid removal 10, zinc-containing sulfate solution as feed solution is fed to a dialysis unit 11 of acid removal 10. Dialysis unit 11 is constructed and operated as described with reference to FIG. 1. Feed solution is fed into the dialyzate compartments 13, sulfate ions pass through the membranes 14 into the diffusate compartments 15 forming a diffusate. Dialyzate reduced in acid content and substantially containing the zinc and the impurities from the feed solution is passed to solvent extraction 20, to be described. Dialyzate is removed from dialyzate compartments 13 at a rate substantially equal to the rate of addition of feed solution, which is in the range of about 1 to 5.0 L/h.m². These feed rates are increased to about twice the commonly used rates for a process using dialysis only. A solution, to be described, is fed to diffusate compartments 15. Diffusate discharged from diffusate compartments 15 is passed to the diluate compartments of electrodialysis unit 12 of acid removal 10.

Electrodialysis unit 12 is a unit constructed and operated as described with reference to FIG. 1. Diffusate from dialysis 11 is fed to and passed through the diluate compartments, generally indicated with D, of electrodialysis unit 12, and diluate withdrawn from the diluate compartments D is recirculated. A portion of the circulating diluate is passed through diffusate compartment 15 of dialysis 11. Circulating diluate has an acid content lower than that of the feed solution, and passing diluate through diffusate compartments 15 provides the necessary driving force for the dialysis. Before entering diffusate compartments 15, an amount of acid-receiving solution may be added to increase the driving force further.

The acid-receiving solution may be dilute sulfuric acid, salt solution or water. The portion of circulating diluate and a quantity of acid-receiving solution, if any, is fed to diffusate compartments 15 at a rate in the range of about 2 to 10 L/h.m² of membrane surface area. The amount of acid-receiving solution is chosen to balance any water losses to the dialyzate and concentrate streams leaving dialysis 11 and electrodialysis 12, respectively.

Concentrate is removed from the concentrate compartments, generally indicated with C, and is recirculated through these compartments. A portion of the circulating concentrate is recovered as acid product.

As stated, either the dialyzate from the dialysis or, when only electrodialysis is used, the diluate from the electrodialysis is passed from acid removal 10 to dual-circuit, side-by-side simultaneous solvent extraction 20, as shown in FIG. 1. In extraction 20, sulfuric acid and zinc are each separated by a suitable extractant in one or more extraction stages, and the zinc extraction raffinate 25 from each zinc extraction stage in the zinc extraction circuit is exchanged with the acid extraction raffinate 26 from a corresponding acid extraction stage in the acid extraction circuit. Substantially pure sulfuric acid or a sulfate solution and substantially pure zinc sulfate solution are stripped from the respective extracts, while the withdrawn residual solution is substantially free of zinc and acid, and substantially contains the impurities.

Again, with reference to FIG. 1, dialyzate or diluate, i.e. second solution from acid removal 10 reduced in acid content and substantially containing the zinc and impurities contained in the feed solution to the process, is fed to acid extraction 21. The concentration of acid in solution fed to solvent extraction 20 is usually below about 50 g/L, but should preferably be as low as possible in order to reduce the need for acid removal during solvent extraction. In the acid extraction circuit, acid is extracted from the raffinate 25 from zinc extraction 22, to be described, and combined with second solution from acid removal 10. The combined aqueous solution is mixed with an organic extractant suitable for extracting sulfuric acid, and an acid extract and an acid extraction raffinate 26 are formed. Suitable extractants for sulfuric acid are amine-type extractants including primary, secondary, tertiary and quaternary amines such as, for example, Alamine TM 336 (tricaprylamine) or Primene TM JMT (a 16-22 carbon atom, tert alkyl primary amine). The acid extractant is mixed with a suitable diluent to give an amine concentration of about 5 to 30% by volume. If desired, a modifier may be added at a concentration of, for example, about 1 to 8% by volume. The acid extract, i.e. the acid-loaded organic phase, is passed to acid stripping 23, and the acid extraction raffinate 26 is passed to zinc extraction 22 of the zinc extraction circuit.

In acid stripping 23, sulfuric acid is stripped from the acid extract, and stripped organic phase is returned to acid extraction 21. The sulfuric acid is stripped with a compound chosen from water and suitable alkaline substances. Stripping with water makes it possible to recover sulfuric acid as such, while stripping with an alkaline substance forms a sulfate. Stripping with alkali is more efficient than stripping with water, and is preferred. One of a number of alkaline substances such as alkali metal hydroxide or ammonium hydroxide solutions may be used, but the use of ammonium hydroxide is preferred because a saleable byproduct is obtained. The formed sulfuric acid or sulfate solution, preferably ammonium sulfate solution, is recovered. Both acid extraction 21 and acid stripping 23 are carried out at ambient conditions, and may be carried out in one or more stages.

The raffinate 26 from acid extraction 21 is passed to zinc extraction 22, where zinc is extracted from the solution with a suitable organic extractant. Suitable extractants are suitable organic phosphoric acids such as di-2-ethylhexyl phosphoric acid (D2EHPA) or mono-2-ethylhexylphosphoric acid (M2EHPA) or mixtures thereof, suitable phosphonic acids, suitable phosphinic acids, and suitable thiophosphinic acids such as bis-2,4,4-trimethylpentylmonothiophosphinic acid such as, for example, Cyanex TM 302 or bis-2,4,4-trimethylpentyldithiophosphinic acid, such as, for example Cyanex TM 301. The use of Cyanex TM 302, D2EHPA or a mixture of M2EHPA and D2EHPA is preferred. The organic extractants are used with a diluent such as, for example, Exxsol TM D80 to form an organic phase containing extractant in the range of about 5 to 40%, by volume, the balance being diluent. Modifiers may be used. The organic phase is mixed with acid extraction raffinate from acid extraction 21. The mixing is carried out for a time sufficient to achieve substantially equilibrium zinc extraction into the organic phase, i.e. the zinc extract, and with the formation of a zinc extraction raffinate and residual solution. The pH in zinc extraction 22 is maintained in the range of about 1.3 to 5.0, and preferably in the range of about 1.7 to 3.0 by the addition of an appropriate amount of alkali such as sodium hydroxide or ammonium hydroxide. The zinc extraction 22 may be carried out in one or more stages.

Zinc extraction raffinate from zinc extraction 22, which also contains the acid generated during zinc extraction, is passed to acid extraction 21. Residual solution is removed from the process as substantially zinc-free raffinate. Residual solution is substantially free of acid and zinc but contains substantially all the impurities, especially magnesium and manganese, that were contained in the zinc-containing sulfate feed solution to the process.

Residual solution may be passed to further treatment for the removal of environmentally harmful substances before being discarded.

The zinc extract from zinc extraction 22 is passed to zinc stripping 24 for the removal of zinc from the zinc extract and for the recovery of a concentrated zinc sulfate solution and a stripped organic phase. Although one stage is shown, zinc stripping 24 may be carried out in one or more stages. Stripping 24 is done with sulfuric acid. Preferably, the sulfuric acid is acid recovered from acid removal 10. Depending on the concentration of the acid recovered from removal 10, the acid for stripping may be used as it is recovered from acid removal 10 or may be fortified by the addition of an amount of concentrated sulfuric acid. The strength of the acid used in zinc stripping 24 is dependent on the zinc concentration desired in the zinc sulfate solution to be recovered from zinc stripping 24. The concentration of zinc in the recovered solution may, for example, be the same as that used in electrolyte used in the electrowinning process of zinc, such as for example, about 60 to 160 g/L zinc as zinc sulfate, preferably about 100 to 160 g/L. When 140 to 160 g/L zinc in the product solution is desired, the acid used acid. Removal of traces of organic extractants in the recovered zinc sulfate solution may be desirable, and may be done, for example, by a treatment with activated carbon (not shown).

The stripped organic phase is recycled from zinc stripping 24 to zinc extraction 22, and, if desired, may be subjected to scrubbing before being added to extraction 22. Fresh organic phase may be added to make up for any losses that may have occurred.

The invention will now be illustrated by the following non-limitative examples.

EXAMPLE 1

A solution of spent zinc electrowinning electrolyte containing 100 g/L $H_2SO_4$, 5.0 g/L Zn and 7.4 g/L Mg was fed at a rate of 43.4 L/h.m$^2$ into the diluate compartments of an electrodialysis unit having alternating Selemion TM CMV-A and AAV membranes. Electrodialysis was carried out at 1000 A/m$^2$, at 41° C. for 24 hours with water being added to the concentrate compartments at a rate of 2 L/h.m$^2$. Diluate and concentrate were recycled through their respective compartments at a linear velocity of 5 cm/sec. The final diluate contained 85 g/L $H_2SO_4$, 5.1 g/L Zn and 7.5 g/L Mg, and the final concentrate contained 216 g/L $H_2SO_4$, 0.2 g/L Zn and 0.2 g/L Mg.

EXAMPLE 2

Using the same electrodialysis unit as in example 1, the test of example 1 was repeated under the same conditions, but instead of feeding water to the concentrate compartments, a portion of the feed solution was used at a rate of 2.9 L/h.m$^2$. The final diluate contained 85 g/L $H_2SO_4$, 5.3 g/L Zn and 7.5 g/L Mg, and the final concentrate contained 220 g/L $H_2SO_4$, 3.8 g/L Zn and 5.9 g/L Mg.

The results of Examples 1 and 2 show that Single stage electrodialysis provided satisfactory separation of the acid and the metals in the feed solution. However, the acid concentration in the diluate was only reduced by 15% from that of the feed.

EXAMPLE 3

If the zinc-containing sulfate solution has a high sulfuric acid content, two stages of electrodialysis are required to reduce the sulfuric acid concentration to a desired low value. A spent electrolyte containing 150 g/L $H_2SO_4$, 49 g/L Zn and 8.2 g/L Mg was fed at a rate of 5.5 L/h.m$^2$ to the diluate compartments of a first electrodialysis unit having alternating Selemion TM CMV-A and AAV membranes. Water was fed to the concentrate compartments at a rate of 1.15 L/h.m$^2$. Electrodialysis was carried out at 52° C. and 1000 A/m$^2$. Diluate from the first unit was fed to the diluate compartments of a second unit, similar to the first unit, and concentrate from the second unit, containing 118 g/L $H_2SO_4$ and 28.5 g/L Zn, was fed to the concentrate compartments of the first unit. The second electrodialysis unit was operated at a current density of 575 A/m$^2$. Diluate from the second unit was recovered as product and found to contain 29 g/L $H_2SO_4$ and 31 g/L Zn. Concentrate from the first unit was recovered as concentrated solution containing 178 g/L $H_2SO_4$ and 44.5 g/L Zn. It is noted that the zinc losses in the concentrated acid product were rather high. Zn losses with the concentrate could be reduced by stripping the zinc from the solution.

EXAMPLE 4

A dialysis unit was assembled to consist of 19 sheets of Selemion TM anionic membranes with a total effective membrane area of 3970 cm$^2$. An acidic sulfate solution containing zinc and impurities was fed to the dialyzate compartments and water to the diffusate compartments of the dialysis unit. The process conditions and results for four tests are given in Table I.

TABLE I

| | Flow rate l/h.m$^2$ | g/L | | | |
|---|---|---|---|---|---|
| | | $H_2SO_4$ | Zn | Mg | Mn |
| Test 1: Selemion DSV membranes; 22° C. | | | | | |
| Feed solution | 0.95 | 150 | 50 | 8 | 1.5 |
| Water | — | — | — | — | — |
| Diffusate | 0.95 | 120 | 2.0 | 0.31 | 0.06 |
| Dialyzate | 1.0 | 29 | 45.7 | 7.3 | 1.4 |
| Test 2: Selemion DSV membranes; 21° C. | | | | | |
| Feed solution | 0.91 | 234 | 20 | 7.9 | 1.1 |
| Water | 0.83 | — | — | — | — |
| Diffusate | 0.76 | 214 | 1.6 | 0.54 | 0.1 |
| Dialyzate | 0.98 | 51 | 17 | 7.0 | 0.93 |
| Test 3: Selemion DMV membranes; 20° C. | | | | | |
| Feed solution | 0.92 | 151 | 50 | 8 | 1.5 |
| Water | 0.92 | — | — | — | — |
| Diffusate | 0.84 | 122 | 1.0 | 0.13 | 0.02 |
| Dialyzate | 1.0 | 35 | 46 | 7.8 | 1.47 |
| Test 4: Selemion DMV membranes | | | | | |
| Feed solution | 0.77 | 234 | 20 | 7.9 | 1.1 |
| Water | 0.79 | — | — | — | — |
| Diffusate | 0.80 | 182 | 0.4 | 0.13 | 0.03 |
| Dialyzate | 0.76 | 45 | 19.8 | 7.9 | 1.1 |

These results show that dialysis may be used to remove acid efficiently and selectively from an acidic zinc sulfate solution containing impurities, but the acid concentration of the diffusate acid product was lower than that of the feed solution in all tests.

EXAMPLE 5

This example illustrates the use of more than one stage dialysis for achieving an increased acid removal. A dialysis unit equipped with Selemion DSV membranes was used to treat a spent electrolyte from a zinc production plant. The results are given in Table II.

TABLE II

| | Flow Rate L/h.m$^2$ | g/L | | | |
|---|---|---|---|---|---|
| | | $H_2SO_4$ | Zn | Mg | Mn |
| Feed Solution | 0.91 | 234 | 22.2 | 8.5 | 1.1 |
| Water | 0.83 | — | — | — | — |
| Diffusate | 0.76 | 216 | 1.4 | 0.48 | 0.07 |
| Dialyzate | 0.98 | 51 | 19 | 8.0 | 0.95 |

The acid-reduced dialyzate was further treated by feeding to a second stage dialysis unit at 0.83 L/h.m$^2$ with water fed countercurrently at 0.81 L/h.m$^2$. The final dialyzate was found to contain 10.6 g/L $H_2SO_4$.

EXAMPLE 6

This example illustrates the effect of temperature on the efficiency of acid removal. Using a dialysis unit equipped with Selemion DMV membranes, tests were carried out at various controlled temperatures. The results are given in Table III.

TABLE III

| Temp. °C. | Feed Rate l/h.m² | g/L $H_2SO_4$ Feed | Dialyzate | Diffusate | Acid Removal g/h.m² |
|---|---|---|---|---|---|
| 25 | 0.99 | 170 | 49 | 125 | 120 |
| 40 | 0.92 | 170 | 30 | 139 | 142 |
| 40 | 1.4 | 170 | 48 | 116 | 171 |

It follows that the acid removal efficiency increases with increasing temperature.

EXAMPLE 7

This example shows that dialysis integrated with electrodialysis yields a concentrated acid substantially free of zinc and impurity metals, and yields an acid-depleted solution substantially containing the zinc and impurity metals. Using the units of Examples 1 and 4, respectively, the test was carried out according to the scheme shown in FIG. 2. Dialysis was carried out with an increased concentration gradient by adjusting the acid concentration of 11 g/L $H_2SO_4$ in the diluate from electrodialysis to 7.5 g/L $H_2SO_4$ prior to feeding the diluate to the diffusate compartment of the dialysis. Solutions were at 40° C. The current density in the electrodialysis was 500 A/m². Flow rates and analyses are given in Table IV.

TABLE IV

| stream | rate L/h.m² | Zn g/L | Mg g/L | $H_2SO_4$ g/L |
|---|---|---|---|---|
| feed to dialysis | 1.7 | 53 | 9.2 | 145 |
| dialyzate | 2.2 | 52 | 8.6 | 38 |
| diffusate | 4.3 | 1.2 | 0.2 | 46 |
| solution to diffusate compartment | 4.8 | 1.2 | 0.2 | 7.5 |
| diffusate to electro-dialysis | 6.7 | 1.2 | 0.2 | 46 |
| diluate | 5.6 | — | — | 11 |
| concentrate | 1.1 | <1 | <0.5 | 220 |

Repeating this test using electrodialysis at 750 A/m² and with a feed rate of 11.6 L/h.m² yielded a diluate at 10 g/L $H_2SO_4$ and an acid product (concentrate) containing 250 g/L $H_2SO_4$.

EXAMPLE 8

This example illustrates the extraction of zinc from sulfate solution with various extractant solutions and at various pH values. Zinc extraction tests were carried with an aqueous feed solution containing 20 g/L Zn, 7.7 g/L Mg and 1.1 g/L Mn obtained form the dialyzate of a dialysis treatment of an acidic sulfate solution.

Portions of the extractant solution were contacted with three fresh portions of the aqueous feed at an o/a (organic to aqueous) volumetric phase ratio of 1, with equilibrium pH values maintained by the addition of sodium hydroxide. The separated aqueous phases were analyzed.

The extractants tested were 20% by volume solutions in Exxsol TM D80 of D2EHPA: di-2-ethylhexylphosphoric acid, EHPA: a mixture of mono- and di-2-ethylhexylphosphoric acid, or MEEPA: mono-2-ethylhexyl-2-ethylhexylphosphonic acid. The pH values and test results are given in Table V.

TABLE V

| Extractant | Loading in Extract Phase, g/L | | |
|---|---|---|---|
| | Zn | Mg | Mn |
| EQUILIBRIUM pH: 0.93 | | | |
| D2EHPA 1st contact: | 2 | 0.1 | 0 |
| 2nd contact: | 2 | 0.1 | 0 |
| 3rd contact: | 2 | 0.1 | 0 |
| EHPA 1st contact: | 2 | 0.4 | 0.1 |
| 2nd contact: | 2 | 0.5 | 0.2 |
| 3rd contact: | 2 | 0.7 | 0.2 |
| MEEPA 1st contact: | 0 | 0 | 0 |
| 2nd contact: | 0 | 0 | 0 |
| 3rd contact: | 0 | 0 | 0 |
| EQUILIBRIUM pH: 1.54 | | | |
| D2EHPA 1st contact: | 8 | 0.1 | 0 |
| 2nd contact: | 10 | 0.1 | 0 |
| 3rd contact: | 11 | 0.1 | 0 |
| EHPA 1st contact: | 5 | 0.8 | 0.2 |
| 2nd contact: | 7 | 0.9 | 0.3 |
| 3rd contact: | 8 | 0.9 | 0.3 |
| MEEPA 1st contact: | 5 | 0.1 | 0.1 |
| 2nd contact: | 6 | 0.1 | 0.2 |
| 3rd contact: | 7 | 0.1 | 0.2 |
| EQUILIBRIUM pH: 2.52 | | | |
| D2EHPA 1st contact: | 17.5 | 0.2 | 0.15 |
| 2nd contact: | 21.5 | 0.1 | 0.25 |
| 3rd contact: | 21.5 | 0.0 | 0.40 |
| EHPA 1st contact: | 16.2 | 0.7 | 0.44 |
| 2nd contact: | 21.2 | 0.3 | 0.40 |
| 3rd contact: | 24.0 | 0.0 | 0.40 |
| MEEPA 1st contact: | 16.1 | 0.3 | 0.20 |
| 2nd contact: | 18.1 | 0.1 | 0.30 |
| 3rd contact: | 20.1 | 0.0 | 0.45 |

The results show only little extraction at the low pH of 0.93 and with some improved extraction of zinc at pH 1.54. At pH 2.52, zinc extraction greatly improved to more than twice what could be achieved at pH 1.54. Moreover, zinc extraction was selective over magnesium and manganese extraction. D2EHPA and EHPA were slightly superior to MEEPA.

EXAMPLE 9

This example illustrates the use of alkylthiophosphinic acids as extractants for zinc. Portions of 15% solutions of Cyanex TM 301 and Cyanex TM 302 in Exxsol TM D80 were conditioned by contacting with two fresh portions of 225 g/L $H_2SO_4$ solution at an o/a ratio of 2. The organic phase was separated and then contacted at an o/a ratio of 2 with a dialyzate solution pre-adjusted to pH 2.7 with sodium hydroxide addition. No further adjustment in pH was made. The aqueous phase was separated and analyzed. The extractant phase was then stripped by contacting with two fresh portions of 225 g/L $H_2SO_4$ solution at an o/a ratio of 7. The aqueous phase was separated and analysed in each case. The results of the extraction and stripping are given in Table VI.

TABLE VI

| AQUEOUS FEED: 45.0 g/L Zn, 7.2 g/L Mg | | |
|---|---|---|
| | Loading in Extractant Phase, g/L | |
| Extraction: | Zn | Mg |
| Cyanex TM 301: | 11.0 | 0.4 |
| Cyanex TM 302: | 5.1 | 0.28 |
| % Zn Stripped | | |
| After 1st | After 2nd | g/L in strip liquor Maximum |

TABLE VI-continued

| AQUEOUS FEED: 45.0 g/L Zn, 7.2 g/L Mg | | | | |
|---|---|---|---|---|
| Stripping: | Contact | Contact | Achieved | Possible |
| Cyanex TM 301: | 28.2 | 35.8 | 21.7 | 77 |
| Cyanex TM 302: | 80.4 | 85.2 | 28.7 | 35.7 |

In comparing Cyanex TM 301 and 302, the results show that while Cyanex TM 301 gave superior zinc extraction, it gave inferior stripping. Increasing the temperature of the stripping step to 44° C. gave a slight improvement.

EXAMPLE 10

This example illustrates acid extraction from zinc-containing solutions by amine extractants. An acidic solution containing 20 g/L Zn and 30 g/L $H_2SO_4$ was contacted with 20% (by volume) solutions of amines in Exxsol TM D80 at an o/a phase ratio of 1. In each contact, the phases were allowed to separate, and the aqueous phase was analyzed. In all cases, no significant change in the zinc concentration was noted. The extraction of acid by two of the amines are given in Table VII.

TABLE VII

| Extractant | Loading after 1st contact (g/L $H_2SO_4$) | Loading after 2nd contact (g/L $H_2SO_4$) |
|---|---|---|
| 20% Primene TM JMT | 25 | 31 |
| 20% Alamine TM 336 | 25 | 33 |

Using a feed solution containing 47 g/L Zn and 39 g/L $H_2SO_4$, Alamine TM 336 was used to determine the effect of extractant concentration. Results are given in Table VIII.

TABLE VIII

| Extractant | Loading after 1st contact (g/L $H_2SO_4$) | Loading after 2nd contact (g/L $H_2SO_4$) |
|---|---|---|
| 10% Alamine TM 336 | 16 | 17 |
| 20% Alamine TM 336 | 29 | 35 |

No apparent difference in phase disengagement rate was observed for the 10% and 20% extractant solutions. Therefore, the use of a 20% solution is preferred for its higher capacity for acid removal.

EXAMPLE 11

This example illustrates the use of 20% D2EHPA in Exxsol TM D80 for the efficient extraction of zinc. Efficient and selective zinc extraction required pH control during extraction. Various extractions were carried out with the equilibrium pH adjusted to 2.52 by sodium hydroxide addition. The aqueous feed solution containing 21 g/L Zn was derived from a dialysis treatment of an acidic zinc sulfate solution from a zinc production plant. The equilibrium distribution of zinc derived from a series of six contacts at pH 2.52 is given in Table IX.

TABLE IX

| g/L Zn in Raffinate | g/L Zn in Extract |
|---|---|
| 1.5 | 8.3 |
| 3.0 | 16.5 |
| 4.5 | 18.0 |
| 6.0 | 18.3 |
| 12 | 20.0 |
| 18 | 22.0 |

The equilibrium data can be used to show that a feed solution containing 21 g/L Zn can be treated in two countercurrent extraction stages at an o/a phase ratio of 3:2 in order to reduce the zinc concentration to about 1.5 g/L or less in the raffinate.

EXAMPLE 12

This example illustrates the efficient stripping of zinc from a loaded 20% DEHPA in Exxsol TM D80 extractant. An extract containing 22 g/L Zn was stripped in contacts with a 225 g/L $H_2SO_4$ solution simulating two countercurrent stages.

A zinc concentration of 135 g/L was obtained in the resulting strip liquor. By difference, it was calculated that zinc stripping from the extract was over 99% complete, with the residual zinc in the organic phase reduced to 0.07 g/L.

Thus zinc was efficiently stripped from the 20% DEHPA solution.

EXAMPLE 13

This example illustrates how dialysis and solvent extraction can be integrated in the treatment of a zinc-containing acid sulfate solution. Spent electrolyte from electrolytic zinc production containing 234 g/L $H_2SO_4$, 22 g/L Zn, 8.5 g/L Mg and 1.1 g/L Mn was filtered to remove any solids and fed at 0.82 L/h.m$^2$ to the dialyzate compartments of a dialysis unit equipped with Selemion TM DSV membranes. Water was fed to the diffusate compartments at 0.85 L/h.m$^2$. A diffusate stream was withdrawn at 0.76 L/h.m$^2$ and was found to contain 212 g/L $H_2SO_4$, 1.6 g/L Zn, 0.54 g/L Mg and 0.08 g/L Mn. The dialyzate solution, withdrawn form the dialyzate compartments at 0.91 L/h.m$^2$, was found to contain 42 g/L $H_2SO_4$, 20 g/L Zn, 7.9 g/L Mg and 0.95 g/L Mn. The dialyzate was fed to the first stage of acid extraction of a dual-circuit, side-by-side, zinc and acid extraction. Two stages for each extraction were provided using four mixer-settlers. The organic in the acid extraction circuit was a 20% by volume solution of Alamine TM 336 in Exxsol TM D80, and 20% D2EHPA in Exxsol TM D80 was used in the zinc circuit. With respect to fresh aqueous feed flow, the acid extractant flow was in the ratio of 4 to 1, and the zinc extractant flow was in the ratio of 1.5 to 1. The zinc extraction and the acid extraction were operated with counter-current and cross-current flows respectively. The raffinate from corresponding acid and zinc extraction stages were exchanged continuously, thus maintaining a raffinate pH at 1.7 to 3 with simultaneous zinc and acid extraction. A final residual raffinate containing 0.2 g/L Zn, 7.8 g/L Mg and 0.92 g/L Mn and at a pH of 1.9 was withdrawn from the second zinc extraction stage.

The acid extract from the acid extraction was treated in a single stage with an ammonium hydroxide solution to strip the loaded acid, giving an ammonium sulfate solution at 450 g/L $(NH_4)_2SO_4$. The addition of ammonium hydroxide was controlled to maintain the stripping at pH 8 in the aqueous phase. The stripped acid extractant was scrubbed in a single stage with a dilute ammonium sulfate solution derived by feeding water and a portion of the strip liquor from the acid stripping stage. The scrubbed acid extractant was then recycled to the acid extraction.

The zinc extract was treated in a two-stage countercurrent stripping using a 240 g/L $H_2SO_4$ solution fed at an aqueous to organic ratio of 1:11. A zinc sulfate solution containing 144 g/L Zn was produced. The stripped zinc extractant was recycled to the zinc extraction.

EXAMPLE 14

This example illustrates the use of integrated dialysis and electrodialysis for acid removal followed with solvent extraction for the recovery of zinc.

A feed solution containing 145 g/L $H_2SO_4$, 53 g/L Zn, 7.5 g/L Mg and 1.5 g/L Mn was fed at 1.7 L/h.m$^2$ to the dialyzate compartments of a dialysis unit equipped with Selemion TM DMV membranes. Water was added to a portion taken from a recirculating diluate stream from an electrodialysis unit to give a solution containing 7.5 g/L $H_2SO_4$, 1.2 g/L Zn, 0.2 g/L Mg and 0.03 g/L Mn. This solution was fed at 4.8 L/h.m$^2$ to the diffusate compartments of the dialysis unit. The dialysis unit was operated at 25° C. Acid was removed from the feed solution giving a dialyzate which contained 38 g/L $H_2SO_4$, 41.2 g/L Zn, 5.8 g/L Mg and 1.2 g/L Mn. The dialyzate was withdrawn at 2.2 L/h.m$^2$. A diffusate stream, withdrawn at 4.3 L/h.m$^2$, contained 46 g/L $H_2SO_4$, 1.2 g/L Zn, 0.16 g/L Mg and 0.03 g/L Mn. The diffusate was fed to the diluate compartments of the electrodialysis unit at 6.7 L/h.m$^2$. The electrodialysis was carried out at 500 A/m$^2$ and 45° C. A portion of the recirculating diffusate, withdrawn at 5.6 L/h.m$^2$, was found to contain 11 g/L $H_2SO_4$, 1.3 g/L Zn, 0.2 g/L Mg and 0.04 g/L Mn. The withdrawn diluate solution was used in making a feed solution for the diffusate compartments of the dialysis unit as described above. A portion of the recirculating concentrate was withdrawn at 1.1 L/h.m$^2$ as the acid product containing 220 g/L $H_2SO_4$, 0.7 g/L Zn, 0.1 g/L Mg and 0.02 g/L Mn.

The dialyzate product was fed to a dual-circuit, side-by-side, zinc and acid extraction process similar to that described in Example 13. The acid extractant was 20% Alamine TM 336 in Exxsol TM D80 fed at organic to aqueous feed ratio of 4. The zinc extractant was 30% D2EHPA in Exxsol TM D80 fed at an organic to aqueous ratio of 3 to 1. The solvent extraction was carried out as described for Example 13, except that a spent acid containing 145 g/L $H_2SO_4$, 53 g/L Zn, 7.5 g/L Mg and 1.5 g/L Mn was used for zinc stripping. A residual (raffinate) solution was withdrawn which contained 0.15 g/L Zn, 5.8 g/L Mg, 1.1 g/L Mn and at pH 2.1.

Zinc stripping, carried out at an organic to aqueous ratio of 6.7 to 1, gave a strip liquor containing 145 g/L Zn, 7.5 g/L Mg, 1.5 g/L Mn and 6 g/L $H_2SO_4$. Acid stripping with ammonium hydroxide at pH 8 gave an ammonium sulfate solution containing 445 g/L $(NH_4)_2SO_4$.

It is understood that changes and modifications may be made in the embodiments of the invention without department from the scope and purview of the appended claims.

I claim:

1. A method for treating zinc-containing sulfate solution containing zinc sulfate, sulfuric acid and impurity metals which method comprises the steps of feeding zinc-containing sulfate solution to an acid removal step for the formation of a first solution containing sulfuric acid, said first solution being substantially free of zinc and impurity metals, and for the formation of a second solution having a relatively low concentration of sulfuric acid and substantially containing the zinc and impurity metals; recovering said first solution; passing said second solution to dual-circuit, side-by-side simultaneous solvent extraction for the extraction of sulfuric acid in an acid extraction circuit with an organic extractant suitable for the extraction of sulfuric acid forming an acid extract and for the extraction of zinc in a zinc extraction circuit with an organic extractant suitable for the extraction of zinc forming a zinc extract, and the formation of residual solution; recovering sulfate from said acid extract as a compound chosen from the group consisting of sulfuric acid, sodium sulfate and ammonium sulfate; and recovering extracted zinc from said zinc extract as a zinc sulfate solution.

2. A method as claimed in claim 1, wherein said acid removal is carried out by dialysis in a dialysis unit comprising alternating dialyzate compartments and diffusate compartments separated by suitable anionic membranes; feeding said zinc-containing sulfate solution to said dialyzate compartments; forming a diffusate containing sulfuric acid substantially free of zinc and impurities; recovering said diffusate as said first solution; forming a dialyzate having a reduced acid content and substantially containing the zinc and impurities in said dialyzate compartments; and passing dialyzate as said second solution from said dialyzate compartments to said solvent extraction.

3. A method as claimed in claim 2, wherein said solvent extraction comprises passing said second solution to an acid extraction; mixing said second solution in said acid extraction with an amine-type extractant suitable for extracting acid for the formation of an acid extract and an acid extraction raffinate; passing said acid extract to an acid stripping; stripping said acid from said acid extract with a compound chosen from water and suitable alkaline substances for the formation of sulfuric acid or a sulfate, respectively; recovering said formed sulfuric acid or sulfate; passing said acid extraction raffinate to a zinc extraction; mixing said acid extraction raffinate in said zinc extraction with a suitable extractant for zinc chosen from the group consisting of organic phosphoric acids, phosphonic acids, phosphinic acids and thiophosphinic acids for the formation of a zinc extract and a zinc extraction raffinate; maintaining the pH in said zinc extraction at a value in the range of about 1.3 to 5.0 by the addition of an appropriate amount of alkali; passing said zinc extract to a zinc stripping; stripping said zinc from said zinc extract with sulfuric acid for the formation of a concentrated zinc sulfate solution; recovering the formed zinc sulfate solution; and passing said zinc extraction raffinate to said acid extraction and wherein each of said acid extraction, said acid stripping, said zinc extraction and said zinc stripping is carried out in one or more stages.

4. A method as claimed in claim 3, wherein said amine-type extractant is chosen from the group of primary, secondary and tertiary amines, said organic phosphoric acids are chosen from the group consisting of mono-2-ethylhexylphosphoric acid, di-2-ethylhexylphosphoric acid and mixtures thereof, said thio-phosphinic acids are chosen from the group consisting of bis-2,4,4-trimethylpentylmonothiophosphinic acid and bis-2,4,4-trimethylpentyldithiophosphinic acid, and said phosphonic acids is mono-2-ethylhexyl-2-ethylhexylphosphonic acid.

5. A method as claimed in claim 3, wherein said acid is stripped in said acid stripping with a compound selected from the group consisting of water for the recovery of sulfuric acid, ammonia, ammonium hydroxide and alkali metal hydroxide solutions for the recovery of a sulfate solution.

6. A method as claimed in claim 3, wherein said pH is maintained in the range of about 1.7 to 3.0.

7. A method as claimed in claim 2, wherein said extractant suitable for the extraction of sulfuric acid is chosen from the group consisting of tricaprylamine and a tert alkyl primary amine containing carbon atoms in the range of 16 to 22, and said extractant suitable for the extraction of zinc is chosen from the group consisting of bis-2,4,4-trimethylpentylmonothiophosphinic acid, bis-2,4,4-trimethylpentyldithiophosphinic acid, mono-2-ethylhexyl-2-ethylhexylphosphonic acid, di-2-ethylhexylphosphoric acid, and a mixture of di-2-ethylhexylphosphoric acid and mono-2-ethylhexylphosphoric acid.

8. A method as claimed in claim 1, wherein said acid removal is carried out by electrodialysis in an electrodialysis unit comprising a multiplicity of alternating suitable cation permselective exchange membranes and suitable anion permselective exchange membranes arranged in a stack defining alternating diluate compartments and concentrate compartments between an anode in an anode compartment and a cathode in a cathode compartment; applying a current equivalent to a value of the current density in the range of about 10 A/m$^2$ to 1000 A/m$^2$ between said anode and said cathode; feeding zinc-containing sulfate solution into said diluate compartments; forming a concentrate containing sulfuric acid substantially free of zinc and impurities in said concentrate compartments; recovering said concentrate as said first solution; forming a diluate having a reduced acid content and substantially containing the zinc and impurities; and passing diluate as said second solution to said solvent extraction.

9. A method as claimed in claim 8, wherein the current density is in the range of about 400 A/m$^2$ to 1000 A/m$^2$.

10. A method as claimed in claim 8, wherein said solvent extraction comprises passing said second solution to an acid extraction; mixing said second solution in said acid extraction with an amine-type extractant suitable for extracting acid for the formation of an acid extract and an acid extraction raffinate; passing said acid extract to an acid stripping; stripping said acid from said acid extract with a compound chosen from water and suitable alkaline substances for the formation of sulfuric acid or a sulfate, respectively; recovering said formed sulfuric acid or sulfate; passing said acid extraction raffinate to a zinc extraction; mixing said acid extraction raffinate in said zinc extraction with a suitable extractant for zinc chosen from the group consisting of organic phosphoric acids, phosphonic acids, phosphinic acids and thiophosphinic acids for the formation of a zinc extract and a zinc extraction raffinate; maintaining the pH in said zinc extraction at a value in the range of about 1.3 to 5.0 by the addition of an appropriate amount of alkali; passing said zinc extract to a zinc stripping; stripping said zinc from said zinc extract with sulfuric acid for the formation of a concentrated zinc sulfate solution; recovering the formed zinc sulfate solution; and passing said zinc extraction raffinate to said acid extraction and wherein each of said acid extraction, said acid stripping, said zinc extraction and said zinc stripping is carried out in one or more stages.

11. A method as claimed in claim 10, wherein said amine-type extractant is chosen from the group of primary, secondary and tertiary amines, said organic phosphoric acids are chosen from the group consisting of mono-2-ethylhexylphosphoric acid, di-2-ethylhexylphosphoric acid and mixtures thereof, said thio-phosphinic acids are chosen from the group consisting of bis-2,4,4-trimethylpentylmonothiophosphinic acid and bis-2,4,4-trimethylpentyldithiophosphinic acid, and said phosphonic acids is mono-2-ethylhexyl-2-ethylhexylphosphonic acid.

12. A method as claimed in claim 10, wherein said acid is stripped in said acid stripping with a compound selected from the group consisting of water for the recovery of sulfuric acid, ammonia, ammonium hydroxide and alkali metal hydroxide solutions for the recovery of a sulfate solution.

13. A method as claimed in claim 10, wherein said pH is maintained in the range of about 1.7 to 3.0.

14. A method as claimed in claim 8, wherein said extractant suitable for the extraction of sulfuric acid is chosen from the group consisting of tricaprylamine and a tert alkyl primary amine containing carbon atoms in the range of 16 to 22, and said extractant suitable for the extraction of zinc is chosen from the group consisting of bis-2,4,4-trimethylpentylmonothiophosphinic acid, bis-2,4,4-trimethylpentyldithiophosphinic acid, mono-2-ethylhexyl-2-ethylhexylphosphonic acid, di-2-ethylhexylphosphoric acid, and a mixture of di-2-ethylhexylphosphoric acid and mono-2-ethylhexylphosphoric acid.

15. A method as claimed in claim 1, wherein said acid removal is carried out by dialysis and electrodialysis in an integrated fashion in a dialysis unit comprising alternating dialyzate compartments and diffusate compartments separated by suitable anionic membranes, and in an electrodialysis unit comprising a multiplicity of alternating suitable cation permselective exchange membranes and suitable anion permselective exchange membranes defining alternating diluate compartments and concentrate compartments between an anode in an anode compartment and a cathode in a cathode compartment; feeding said zinc-containing sulfate solution to said dialyzate compartments; forming a dialyzate having a reduced acid content and substantially containing the zinc and impurities in said dialyzate compartments; passing dialyzate solution as said second solution from said dialyzate compartments to said solvent extraction; forming a diffusate in said diffusate compartments; passing diffusate from said diffusate compartments to the diluate compartments of said electrodialysis unit; applying an electrical current equivalent to a value of the current density in the range of about 10 A/m$^2$ to 1000 A/m$^2$ between said anode and said cathode; recirculating diluate through said diluate compartments; passing a portion of the recirculating diluate to said diffusate compartments of said dialysis unit; forming a concentrate containing sulfuric acid in said concentrate compartments; recirculating said concentrate through said concentrate compartments; and recovering at least a portion of the recirculating concentrate as said first solution containing sulfuric acid, said first solution being substantially free of zinc and impurities.

16. A method as claimed in claim 15, wherein the current density is in the range of about 400 A/m$^2$ to 1000 A/m$^2$.

17. A method as claimed in claim 15, wherein an acid-receiving solution is added to said portion of recirculating diluate passed to said diffusate compartments of said dialysis unit.

18. A method as claimed in claim 17, wherein said acid-receiving solution and said portion of recirculating diluate are passed to said diffusate compartments at a rate of about 2 to 10 L/h.m$^2$ of membrane surface area.

19. A method as claimed in claim 18, wherein solution to said dialyzate compartments is passed to said dialyzate compartments at a rate in the range of about 1 to 5 L/h.m$^2$ and wherein said acid-receiving solution and said portion of recirculating diluate are passed to said diffusate compartments at a rate of about 2 to 10 L/h.m$^2$ of membrane surface area.

20. A method as claimed in claim 15, wherein said solvent extraction comprises passing said second solution to an acid extraction; mixing said second solution in said acid extraction with an amine-type extractant suitable for extracting acid for the formation of an acid extract and an acid extraction raffinate; passing said acid extract to an acid stripping; stripping said acid from said acid extract with a compound chosen from water and suitable alkaline substances for the formation of sulfuric acid or a sulfate, respectively; recovering said formed sulfuric acid or sulfate; passing said acid extraction raffinate to a zinc extraction; mixing said acid extraction raffinate in said zinc extraction with a suitable extractant for zinc chosen from the group consisting of organic phosphoric acids, phosphonic acids, phosphinic acids and thiophosphinic acids for the formation of a zinc extract and a zinc extraction raffinate; maintaining the pH in said zinc extraction at a value in the range of about 1.3 to 5.0 by the addition of an appropriate amount of alkali; passing said zinc extract to a zinc stripping; stripping said zinc from said zinc extract with sulfuric acid for the formation of a concentrated zinc sulfate solution; recovering the formed zinc sulfate solution; and passing said zinc extraction raffinate to said acid extraction and wherein each of said acid extraction, said acid stripping, said zinc extraction and said zinc stripping is carried out in one or more stages.

21. A method as claimed in claim 20, wherein said amine-type extractant is chosen from the group of primary, secondary and tertiary amines, said organic phosphoric acids are chosen from the group consisting of mono-2-ethylhexylphosphoric acid, di-2-ethylhexylphosphoric acid and mixtures thereof, said thio-phosphinic acids are chosen from the group consisting of bis-2,4,4-trimethylpentylmonothiophosphinic acid and bis-2,4,4-trimethylpentyldithiophosphinic acid, and said phosphonic acids is mono-2-ethylhexyl-2-ethylhexylphosphonic acid.

22. A method as claimed in claim 20, wherein said acid is stripped in said acid stripping with a compound selected from the group consisting of water for the recovery of sulfuric acid, ammonia, ammonium hydroxide and alkali metal hydroxide solutions for the recovery of a sulfate solution.

23. A method as claimed in claim 20, wherein said pH is maintained in the range of about 1.7 to 3.0.

24. A method as claimed in claim 15, wherein said extractant suitable for the extraction of sulfuric acid is chosen from the group consisting of tricaprylamine and a tert alkyl primary amine containing carbon atoms in the range of 16 to 22, and said extractant suitable for the extraction of zinc is chosen from the group consisting of bis-2,4,4-trimethylpentylmonothiophosphinic acid, bis-2,4,4-trimethylpentyldithiophosphinic acid, mono-2-ethylhexyl-2-ethylhexylphosphonic acid, di-2-ethylhexylphosphoric acid, and a mixture of di-2-ethylhexylphosphoric acid and mono-2-ethylhexylphosphoric acid.

25. A method as claimed in claim 1, wherein said solvent extraction comprises passing said second solution to an acid extraction; mixing said second solution in said acid extraction with an amine-type extractant suitable for extracting acid for the formation of an acid extract and an acid extraction raffinate; passing said acid extract to an acid stripping; stripping said acid from said acid extract with a compound chosen from water and suitable alkaline substances for the formation of sulfuric acid or a sulfate, respectively; recovering said formed sulfuric acid or sulfate; passing said acid extraction raffinate to a zinc extraction; mixing said acid extraction raffinate in said zinc extraction with a suitable extractant for zinc chosen from the group consisting of organic phosphoric acids, phosphonic acids, phosphinic acids and thiophosphinic acids for the formation of a zinc extract and a zinc extraction raffinate; maintaining the pH in said zinc extraction at a value in the range of about 1.3 to 5.0 by the addition of an appropriate amount of alkali; passing said zinc extract to a zinc stripping; stripping said zinc from said zinc extract with sulfuric acid for the formation of a concentrated zinc sulfate solution; recovering the formed zinc sulfate solution; and passing said zinc extraction raffinate to said acid extraction and wherein each of said acid extraction, said acid stripping, said zinc extraction and said zinc stripping is carried out in one or more stages.

26. A method as claimed in claim 25, wherein said amine-type extractant is chosen from the group of primary, secondary and tertiary amines, said organic phosphoric acids are chosen from the group consisting of mono-2-ethylhexylphosphoric acid, di-2-ethylhexylphosphoric acid and mixtures thereof, said thio-phosphinic acids are chosen from the group consisting of bis-2,4,4-trimethylpentylmonothiophosphinic acid, and bis-2,4,4-trimethylpentyldithiophosphinic acid, and said phosphonic acids is mono-2-ethylhexyl-2-ethylhexylphosphonic acid.

27. A method as claimed in claim 25, wherein said acid is stripped in said acid stripping with a compound selected from the group consisting of water for the recovery of sulfuric acid, ammonia, ammonium hydroxide and alkali metal hydroxide solutions for the recovery of a sulfate solution.

28. A method as claimed in claim 25, wherein said pH is maintained in the range of about 1.7 to 3.0.

29. A method as claimed in claim 1, wherein said extractant suitable for the extraction of sulfuric acid is chosen from the group consisting of tricaprylamine and a tert alkyl primary amine containing carbon atoms in the range of 16 to 22, and said extractant suitable for the extraction of zinc is chosen from the group consisting of bis-2,4,4-trimethylpentylmonothiophosphinic acid, bis-2,4,4-trimethylpentyldithiophosphinic acid, mono-2-ethylhexyl-2-ethylhexylphosphonic acid, di-2-ethylhexylphosphoric acid, and a mixture of di-2-ethylhexylphosphoric acid and mono-2-ethylhexylphosphoric acid.

* * * * *